Patented May 8, 1928.

1,669,387

UNITED STATES PATENT OFFICE.

EDWIN F. CATHCART, OF LAKEWOOD, OHIO.

COMPOSITION FOR REMOVING NITROCELLULOSE LACQUERS.

No Drawing.   Application filed November 17, 1926.   Serial No. 148,997.

A satisfactory composition can be obtained by melting four and one-half pounds of paraffin in twenty-five gallons of benzol and adding seventy-five gallons of acetone to the benzol-wax and stirring rapidly until cold. The composition for removing nitrocellulose lacquers of present manufacture must contain an active softening agent. The combination of the solvent such as benzol with a softening agent such as acetone produces the active softening agent and this composition is rendered easily applicable and evaporation is retarded by the addition of the wax.

What I claim and desire to secure by Letters Patent of the United States is:

A nitro-cellulose lacquer remover proportioned and compounded substantially as follows: Four and one-half pounds of paraffin melted in twenty-five gallons of benzol and seventy-five gallons of acetone stirred into the paraffin-benzol until the composition of all three becomes cold.

In testimony whereof I affix my signature.

EDWIN F. CATHCART.